: 3,749,734
1-CYANOBENZIMIDAZOLES
John Hannah, Matawan, Donald W. Graham, Mountainside, and Edward F. Rogers, Middletown, N.J., assignors to Merck & Co. Inc., Rahway, N.J.
No Drawing. Filed July 12, 1971, Ser. No. 161,971
Int. Cl. C07d 49/38
U.S. Cl. 260—309.2
5 Claims

ABSTRACT OF THE DISCLOSURE

1 - cyanobenzimidazole having a trifluoromethyl or cyano substituent at the 2-position and two, three or four chlorine substituents in the benzenoid moiety of the molecule are employed as anthelmintic agents and as ectoparasiticides.

The instant invention relates to new compositions of matter classifiable in the field of organic chemistry as 1-cyanobenzimidazoles. More particularly, the instant invention relates to novel 1-cyanobenzimidazoles characterized by having at the 2-position a substituent selected from the group consisting of trifluoromethyl and cyano and by having in the benzenoid moiety of molecule two, three or four chlorine substituents; to methods for preparing these compounds; and to methods for employing them as anthelmintic agents and as ectoparasiticides.

In its composition of matter aspect, therefore, the instant invention may be described as residing in the concept of 1-cyanobenzimidazoles having the formula:

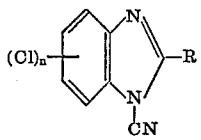

wherein R is a member selected from the group consisting of trifluoromethyl and cyano and n is an integer from 2 to 4.

The instant invention is based upon applicants' discovery that the 1-cyanobenzimidazoles described above show inherent applied use characteristics as anthelmintic agents, notably against Haemonchus sp., Chabertia sp. and Oesophagostomum sp., and as ectoparasiticides, against a relatively wide range of insect parasites including the sheep blow fly (*Lucilia cuprina*), the housefly (*Musca domestica*), the New Zealand cattle tick (*Haemaphysalis longicornis*), the grain weevil (*Tribolium castaneum*), the cattle louse (*Damalinia bovis*), and mosquitoes (Anopheles spp.) and (Culex spp.). The physiological activity of the 1-cyanobenzimidazoles of this invention has been confirmed by standard laboratory techniques. It is contemplated that formulations containing the 1-cyanobenzimidazoles of this invention as the essential active ingredient will be employed in the treatment and control of helminthiasis and as ectoparasiticides.

The novel 1-cyanobenzimidazoles of this invention may be prepared readily by cyanogenation of the corresponding di-(tri or tetra)-chloro-2-trifluoromethyl-(or cyano)-benzimidazole. These starting benzimidazoles are all known compounds and are either available commercially or may be prepared by methods already fully described in the chemical literature. The cyanogenation reaction conveniently may be carried out by treating the starting benzimidazole with a suspension of an alkali metal hydride, such as sodium hydride, potassium hydride and calcium hydride, in a suitable organic solvent, such as dimethylformamide, dimethoxyethane, dimethylsulfoxide and dioxane. It is desirable to employ a sufficient quantity of the suspension to afford a slight excess of the base. After vigorous evolution of hydrogen ceases, the reaction mixture may be heated, preferably under an inert atmosphere for 30 to 60 minutes at about 80° C. and then allowed to stand at room temperature for 6 to 12 hours. An equimolar quantity of a cyanogen halide, such as the chloride, bromide and iodide, preferably cyanogen bromide, is then added to the reaction mixture which then may be heated at about 80° C. for 3 to 6 hours. Removal of the solvent from the cooled mixture under vacuum yields an oily solid residue which may be purified by conventional recrystallization techniques.

It will be appreciated by those skilled in the art that in the case of the trichlo starting materials, and in some dichloro starting materials, introduction of the 1-cyano substituent destroys the symmetry of the benzimidazole nucleus so that the product of the reaction is obtained as a mixture or isomers. Thus, for example, 2-trifluoromethyl-4,5,7-trichlorobenzimidazole when subjected to the cyanogenation reaction described above, yields a mixture of 1-cyano-2-trifluoromethyl - 4,5,7 - trichlorobenzimidazole and 1 - cyano - 2 - trifluoromethyl-4,6,7-trichlorobenzimidazole. Of course, where the benzimidazole starting material is symmetrically substituted, such as in the tertachloro, 5,6-dichloro- and 4-7-dichlorobenzimidazoles, the introduction of the 1-cyano group does not destroy symmetry and only a single product is obtained. Although unnecessary to their subsequent use in the application of anthelmintic therapy or as ectoparasiticides, the isomeric mixtures may be separated, if desired, by conventional chromatographic techniques. Conveniently, chromatography is carried out over silica gel using a mixture of organic solvents, such as methanolic methylene chloride, as the eluant.

When the 1-cyanobenzimidazoles of this invention are employed for the treatment and control of helminthiasis, the specific means employed for administering the benzimidazole to the animal is not critical and any of the methods now used or available for treating animals infected with, or susceptible to infection by helminths are satisfactory. Where it is desired to administer the benzimidazole in dry, solid unit dosage form, capsules, boluses or tablets containing the desired amount of benzimidazole usually are employed. These dosage forms are prepared by intimately and uniformly mixing the active ingredient with suitable finely divided diluents, fillers, disintegrating agents and/or binders such as starch, lactose, talc, magnesium stearate, vegetable gums and the like. Such unit dosage formulations may be varied widely with respect to their total weight and content of anthelmintic agent depending upon factors such as the type of host animal to be treated, the severity and type of infection and the weight of the host. For large animals such as sheep, swine and cattle, unit dosages up to 15 gm., containing from 1 to 12 gm. of benzimidazole, may be employed. It is usually preferred, however, to employ unit dosages weighing from 5 to 10 gm. containing from 0.5 to 8 gm. of benzimidazole. Boluses as well as smaller size tablets contain various binders and lubricants and are compounded by techniques well-known in the art. Capsules are prepared readily by mixing the active ingredient with a diluent such as starch or lactose and filling into the capsule.

In order to treat infected animals by means of a drench, the 1-cyanobenzimidazoles of this invention are mixed with a suspending agent such as bentonite and the solid mix is added to water just prior to administration. Alternatively, ready to use drench formulations such as those described in U.S. Pat. No. 2,918,403, may be employed. Preferred drench formulations contain from about 5 to 50% by weight of the benzimidazole.

The 1-cyanobenzimidazoles described herein also may be administered as a component of the feed of the animals or may be dissolved or suspended in the drinking water.

Such compositions comprise the benzimidazole intimately dispersed in an inert carrier or diluent. By inert carrier, is meant one that will not react with the benzimidazole and one that may be administered safely to animals. Preferably, the carrier is one that is, or may be, an ingredient of the animal ration.

Suitable compositions include feed supplements in which the active ingredient is present in relatively large amounts and which are suitable for addition to the feed either directly or after an intermediate dilution or blending step. Typical carriers or diluents suitable for such compositions include, for example, distillers' dried grains, corn meal, citrus meal, fermentation residues, ground oyster shells, wheat shorts, molasses solubles, corn cob meal, edible bean mill feed, soya grits, crushed limestone and the like. The active benzimidazoles are intimately dispersed throughout the carrier by methods such as grinding, stirring, milling or tumbling. Compositions containing from about 5 to 50% by weight of the benzimidazole are particularly suitable as feed additives.

Examples of typical feed supplements containing the trihalo and tetrahol benzimidazoles of this invention dispersed in a solid carrier are:

|  | Lbs. |
|---|---|
| (A) 1 - cyano - 2-trifluoromethyl-4,5(6),7-trichlorobenzimidazole | 20 |
| Corn distillers' dried grains | 80 |
| (B) 1,2-dicyano-4,5,6,7-tetrachlorobenzimidazole | 5 |
| Wheat standard middling | 95 |
| (C) 1 - cyano-2-trifluoromethyl-4,7-dichlorobenzimidazole | 35 |
| Wheat shorts | 65 |
| (D) 1 - cyano-2-trifluoromethyl-5,6-dichlorobenzimidazole | 50 |
| Corn distillers' grains | 50 |

These, and similar feed supplements, are prepared by uniformly mixing the benzimidazole with the carrier.

Such supplements are added to the animal feed in an amount to give the finished feed the concentration of benzimidazole desired for the treatment and control of helminthiasis. Although the desired concentration of active ingredients will vary depending upon the factors previously mentioned as well as upon the particular benzimidazole employed, the trihalo and tetrahalo benzimidazoles of this invention are usually fed at concentrations of between 0.5 to 2.0% in the feed in order to achieve the desired anthelmintic result.

When employed as ectoparasiticides, the 1-cyanobenzimidazoles of this invention may be incorporated into agricultural compositions in any of the usual ways either with or without wetting agents and inert diluents. The compositions can be in liquid or solid-dust form, the liquid form including emulsions. Such compositions can be formulated so as to contain from about 0.001% to about 50% of the active benzimidazole depending upon whether the composition is to be used as a concentrate or as an end use composition. For end use, the compositions conveniently are formulated so as to contain about 0.001 to about 3% of the benzimidazole.

Typical inert diluents with which the trihalo and tetrahalo benzimidazoles of this invention may be incorporated include, for example, clays, sands, talc, mica, fertilizers and the like, such compositions being in the form of dusts or larger particle size materials. Also, the benzimidazole may be dissolved in a water immiscible solvent, such as for example, a high boiling hydrocarbon, desirably containing emulsifying and wetting agents which compositions act as self-emulsifiable oils upon the addition of water. Typical emulsifying agents and wetting agents which may be employed in compounding either liquid or solid pesticidal formulations containing the benzimidazoles of this invention will include, for example, anionic compounds such as soaps, fatty sulfate esters and fatty aromatic sulfonates; nonionic wetting agents such as condensation products of fatty acids, fatty alcohols or fatty substituted phenols with ethylene oxide, or fatty esters of sugars or polyhydric alcohols, or block copolymers of ethylene oxide and propylene oxide; and cationic agents such as, for example, cetyl trimethylammonium bromide and the like.

The best mode contemplated by applicant for carrying out his invention is illustrated in the following examples, no limitation being intended, except as set forth in the appended claims.

EXAMPLE 1

1-cyano-2-trifluoromethyl-4,5(6),7-trichlorobenzimidazole

Add 2.9 gm. (10 mmoles) of 2-trifluoromethyl-4,5,7-trichlorobenzimidazole to 0.425 gm. of 57% sodium hydride dispersion (10.5 mmoles) in 20 ml. of dry dimethylformamide. After vigorous evolution of hydrogen slows, heat the mixture at 80° C. for 30 minutes under nitrogen and allow the mixture to stand at room temperature for 12 hours. Add 1.06 gm. (10 mmoles) of cyanogen bromide to the reaction mixture at room temperature. Heat the reaction mixture for 3 hours at 80° C. and allow the mixture to stand at room temperature for 12 hours. Remove the dimethylformamide under vacuum. Purify the residue by recrystallization from cyclohexane to obtain 1-cyano-2-trifluoromethyl-4,5(6),7-trichlorobenzimidazole.

EXAMPLE 2

1,2-dicyano-4,5(6),7-trichlorobenzimidazole

Add to 425 mg. of 57% sodium hydride dispersion (10.5 mmoles) in 20 ml. of dry dimethylformamide under nitrogen 2.47 gm. (10 mmoles) of 2-cyano-4,5,7-trichlorobenzimidazole. After vigorous evolution of hydrogen slows, heat the reaction mixture at 90° C. for 30 minutes. Cool the reaction mixture to room temperature and allow to stand for 8 hours. Add 1.06 gm. of cyanogen bromide. Stir the reaction mixture at room temperature for 3 hours and remove the dimethylformamide under vacuum. Purify the residue by recrystallization from cyclohexane to obtain 1,2-dicyano-4,5(6),7-trichlorobenzimidazole.

By repeating the process of Example 1 or 2, substituting equivalent quantities of 2-trifluoromethyl-4,5-dichlorobenzimidazole,
2-cyano-4,5,6,7-tetrachlorobenzimidazole or
2-trifluoromethyl-4,7-dichlorobenzimidazole for the benzimidazoles employed in the examples, there is obtained 1-cyano-2-trifluoromethyl-4(7),5(6)-dichlorobenzimidazole,
1,2-dicyano-4,5,6,7-tetrachlorobenzimidazole and
1-cyano-2-trifluoromethyl-4,7-dichlorobenzimidazole.

It is thus apparent that in order to prepare any of the 1-cyanobenzimidazoles of this invention, it is merely necessary to subject the corresponding 1-unsubstituted benzimidazole to cyanogenation by the described technique.

The subject matter which applicants regard as their invention is particularly pointed out and distinctly claimed as follows:

What is claimed is:

1. A compound selected from the group consisting of benzimidazoles of the formula:

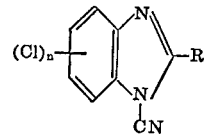

wherein R is a member selected from the group consisting of trifluoromethyl and cyano and $n$ is an integer from 2 to 4.

2. A compound of claim 1 wherein R is trifluoromethyl.
3. A compound of claim 1 wherein R is cyano.
4. A compound of claim 2 wherein $n$ is 3.
5. A compound of claim 4 which is 1-cyano-2-trifluoromethyl-4,5(6),7-trichlorobenzimidazole.

References Cited

UNITED STATES PATENTS

| | | | |
|---|---|---|---|
| 2,194,075 | 3/1940 | Roblin | 260—551 C |
| 2,235,813 | 3/1941 | Hechenbleikner et al. | 260—551 C |
| 2,300,597 | 11/1942 | Roblin | 260—551 C |
| 2,311,281 | 2/1943 | Roblin et al. | 260—551 C |
| 3,198,829 | 8/1965 | Shaw | 260—551 C |
| 3,576,818 | 4/1971 | Samuel et al. | 260—309.2 |

FOREIGN PATENTS

| | | | |
|---|---|---|---|
| 1,430,139 | 1/1966 | France | 260—309.2 |

OTHER REFERENCES

Pellizzari et al., Gaz. Chim. Ital., vol. 48, II, pp. 151–82 (1918).
Pellizzari, Gaz. Chim. Ital., vol. 41, I, pp. 54–9.
Wentrup, Chem. Abst., vol. 74, No. 125622p (1971).
Chemical Abstracts, vol. 74, Subject Index, A–D, January–June 1971, p. 456S (1972).
Zubarovskii et al., Chem. Abst., vol. 74, No. 100560d (1971).

NATALIE TROUSOF, Primary Examiner

U.S. Cl. X.R.

424—273